United States Patent [19]

Hollenbeck et al.

[11] 4,298,136
[45] Nov. 3, 1981

[54] METHOD AND APPARATUS FOR SUPPLYING FILAMENT COILS TO A MOUNT MACHINE

[75] Inventors: Arthur Hollenbeck, West Caldwell; James Petro, Little Falls, both of N.J.

[73] Assignee: Westinghouse Electric Corp., Pittsburgh, Pa.

[21] Appl. No.: 109,009

[22] Filed: Dec. 31, 1979

[51] Int. Cl.³ .............................................. B65H 51/16
[52] U.S. Cl. ........................................ 221/1; 221/278
[58] Field of Search .............................. 221/2, 1, 278; 29/22.15, 25.16, 25.19, 25.2; 198/953

[56] References Cited

U.S. PATENT DOCUMENTS 2,764,800 10/1956 Harwood ............................ 29/25.19
3,033,418 5/1962 Hollopetre ...................... 221/178 X
4,131,192 12/1978 Cipolla ................................ 198/469

Primary Examiner—Stanley H. Tollberg
Attorney, Agent, or Firm—B. R. Studebaker

[57] ABSTRACT

A method and apparatus for supplying filament coils to a mount machine which includes a pair of vibratory storage bowls each having a filament coil discharge location which alternately feed filament coils on demand from the mount machine. There is further included sensing devices and logic circuitry which cause a filament coil to be fed from the other of the filament coil discharge locations when a filament coil is not present at the selected filament coil discharge location.

7 Claims, 6 Drawing Figures

METHOD AND APPARATUS FOR SUPPLYING FILAMENT COILS TO A MOUNT MACHINE

BACKGROUND OF THE INVENTION

In the manufacture of incandescent and fluorescent lamps, filament coils are mounted to the filament coil supports on what is known in the trade as a mount machine. Filament coils are generally delivered to the mount machine by means of a well-known and conventional waking beam.

This invention is directed to the delivery of filament coils to the walking beam for subsequent delivery to the mount machine. In the past, some systems have employed vibratory bowl feed means to deliver the coils individually to the walking beam from bulk storage in the vibratory bowls. It is important that sufficient coils be delivered to the walking beam in a specifically spaced sequence in order that a filament coil is available for each stem and support wire combination reaching the filament mount position on the mount machine. When the stem and support wires are present and no coil is delivered both time and materials can be lost. In a single-bowl feed even if 95% of the time a coil is available for delivery, five out of every one-hundred stems will not receive a filament coil. By employing duplicate vibratory bowl feeds and alternating the feed, although machine speed can be increased, there will be still five coils generally missing out of every one-hundred stems needing a filament coil.

By employing the sensing and detecting system of this invention along with the included switching circuit, coils will be delivered to the walking beam upon demand from the mount machine effectively 100% of the time and mount shrinkage will thereby be considerably reduced.

SUMMARY OF THE INVENTION

The apparatus and method of this invention for delivering filament coils to an automatic mount machine for either incandescent or fluorescent lamps employs at least first and second vibratory bowls for storing a plurality of filament coils. Each of the vibratory bowls include a filament coil discharge location. Sensing means at each of the filament coil discharge locations sense the presence or absence of a filament coil and air means is associated with the filament coil discharge location for directing a short puff of air at a filament coil in the discharge location which is sufficient to eject the filament coil from the filament coil discharge location into means for receiving and conveying the ejected filament coils to a mount machine. An electrical circuit is provided which is responsive to a signal from the mount machine to select a sensed coil at one of the filament coil discharge locations and actuate its associated air means to eject a sensed filament coil into the means for receiving and conveying an ejected filament coil to the mount machine. The electrical circuit means further includes means for switching from said selected filament coil discharge location when the absence of a filament coil is sensed thereat to the other of the filament coil discharge locations and actuating the air means to eject a coil from that second filament coil discharge location into the means for receiving and conveying an ejected filament coil to the mount machine.

By having the ability to sense where a coil is available and deliver a coil from either location on demand from the mount machine, coil filaments will be made available to the mount machine about 100% of the time a coil is required, since the probability of a coil being not available at either location is minimal.

BRIEF DESCRIPTION OF THE DRAWING

Many of the attendant advantages of the present invention will become more readily apparent and better understood as the following detailed description is considered in connection with the accompanying drawing in which.

DESCRIPTION OF THE PREFERRED EMBODIMENT

Figure 1:
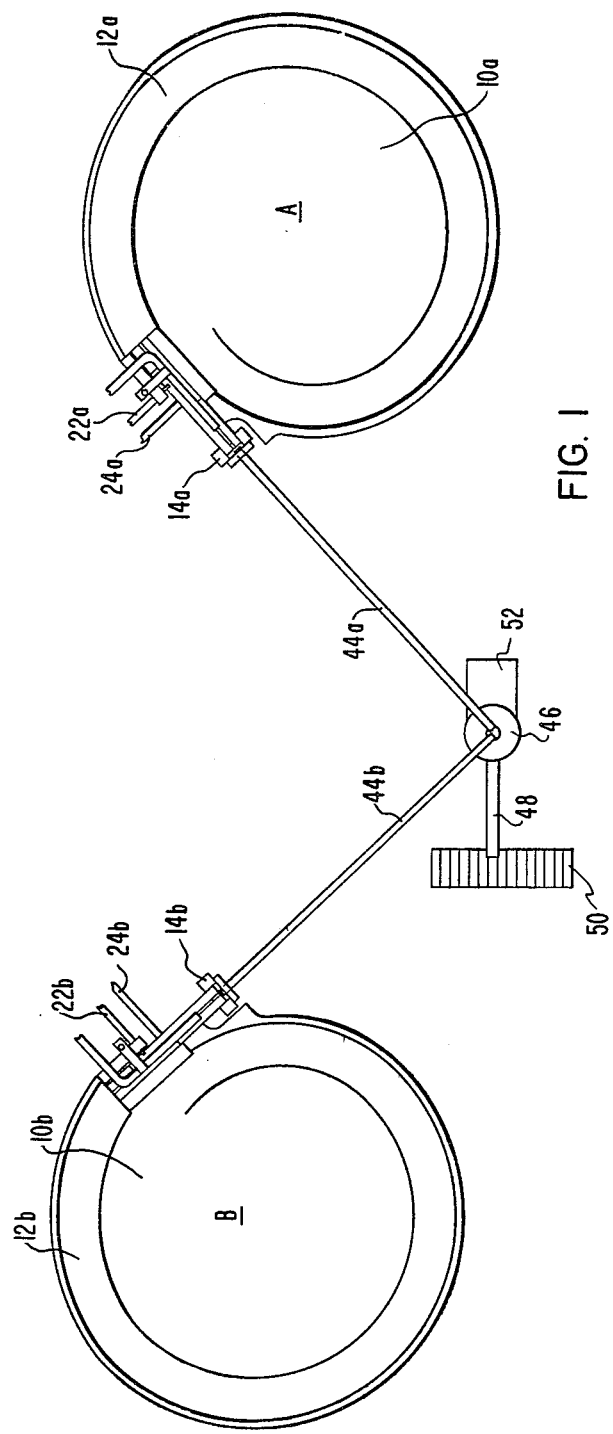
FIG. 1 is a top plan view of the dual vibratory bowl filament delivery system of this invention.
Figure 2:
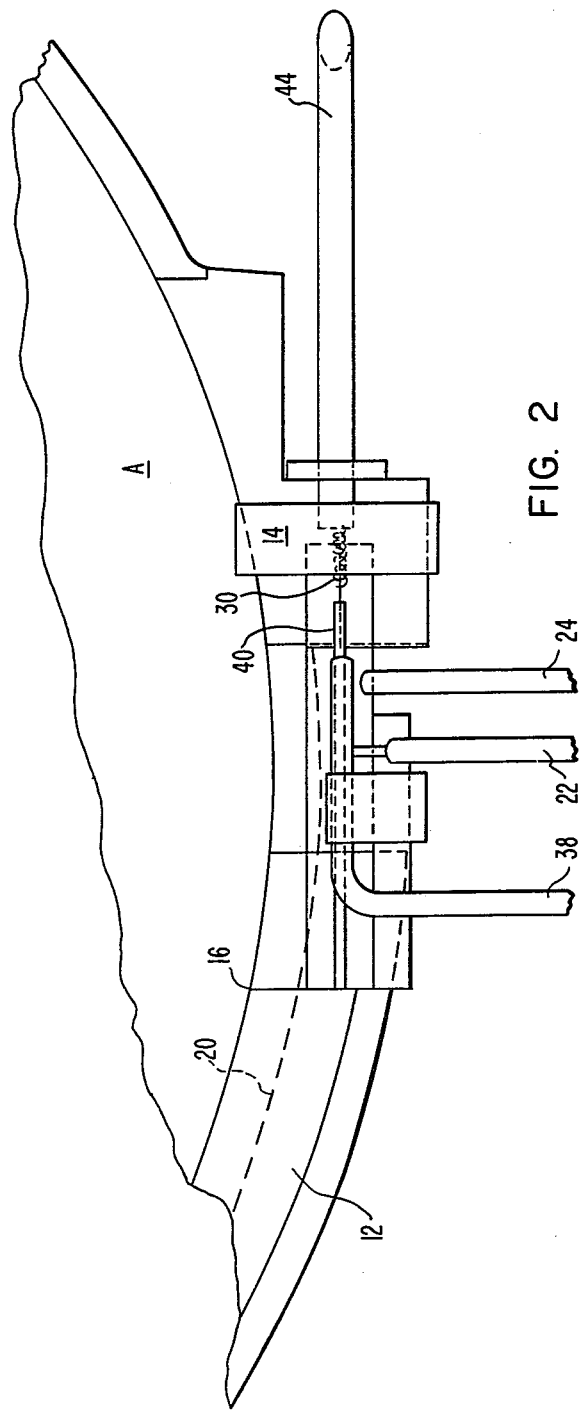
FIG. 2 is a partial top plan view of the filament coil discharge location of one of the vibratory bowls.
Figure 3:
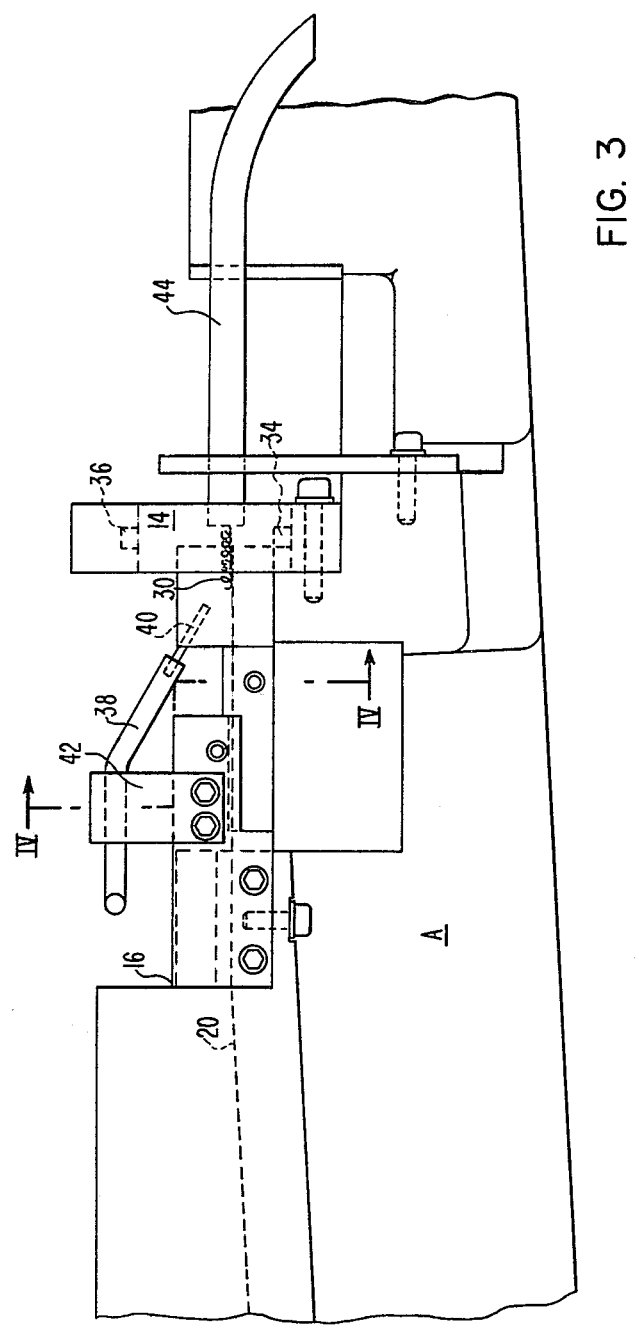
FIG. 3 is a side-elevational view similar to FIG. 2.
Figure 4:
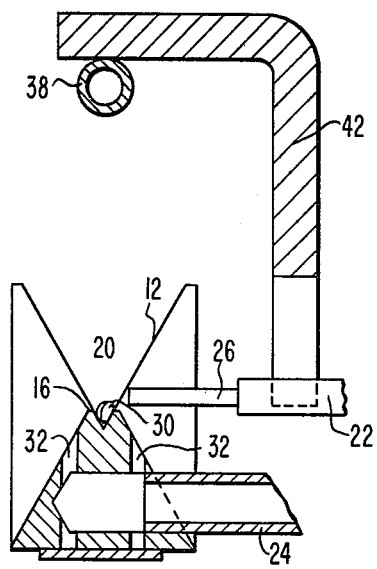
FIG. 4 is a sectional view taken along the line IV—IV of FIG. 3.
Figure 6:
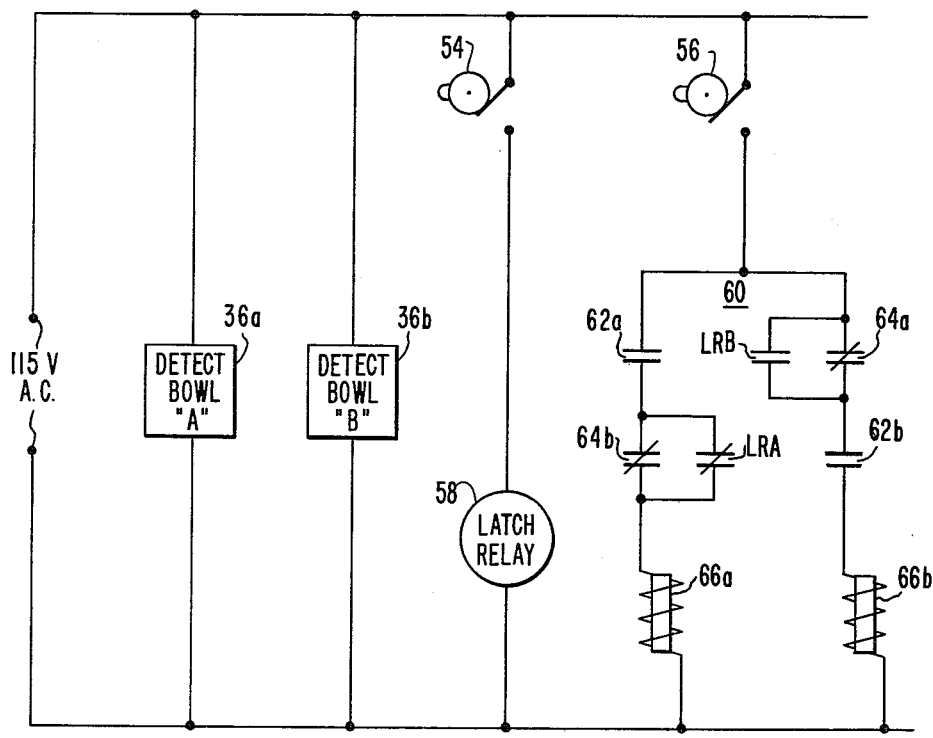
FIG. 6 is a schematic view of the detecting and selecting circuit employed in connection with the filament coil delivery system of this invention.
Figure 5:
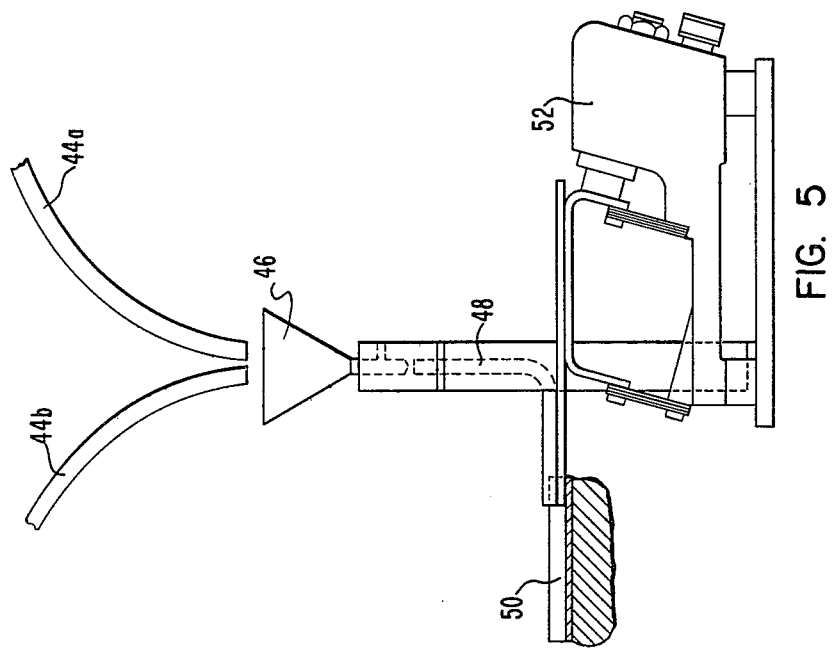
FIG. 5 is a side-elevational view of the horizontal vibrator and walking beam of the filament coil delivery system of this invention.

Referring now in detail to the drawings wherein like reference characters represent like parts throughout the several views, there is illustrated in FIG. 1 a pair of spaced vibratory filament coil storage bowls A and B which are conventionally vibrated to cause filament coils to climb from the storage portion 10 up the circular inclined tracks 12 to the filament coil discharge locations 14. Since each of the vibratory bowls A and B are identical in construction and operation, only the bowl A will be described in detail with reference to the filament coil discharge location 14. It should be understood as this description proceeds that the only the numerical reference character will be used for generic descriptions and will be accompanied by the letter a or b when it is intended to differentiate between the vibratory bowl A and its associated parts and the vibratory bowl B and its associated parts.

As filament coils stored in the bowl 10 creep up the spiral ramp 12 under the influence of the vibrations created in the bowl they reach the discharge location 14. The coils will be bunched as they ride up the V-shaped groove of the track 12 until they reach a point 16 where the interior side wall of the groove 12 is removed and excess coils will fall back into the vibratory bowl. To insure that only a single coil is lying in the bottom 20 of the groove of the track 12 and to eliminate coils which may be riding piggyback on the single coil in the groove an air delivery system is provided through conduits 22 and 24. The conduit 22 directs air through nozzle 26 horizontally directly above the coil 30 and will blow any coil riding piggyback on the coil in the bottom of the groove back into the bowl. The conduit 24 delivers air to vertical air distribution apertures 32 which will cause coils hanging over the edge to also be separated from the single coil at the bottom of the groove which is intended to be delivered to the mount machine.

At the filament coil discharge location 14 a light source 34 directs a beam of light at a light sensor 36 which operates to detect the presence of a coil 30 at the discharge locations 14a and 14b of the separate vibratory bowls. Air drive means is associated with the filament coil discharge location 14 and includes an air delivery conduit 38 having a discharge nozzle 40 at the end thereof directed at the filament coil discharge location 14. The air conduit 38 is supported above the delivery track by a bracket 42.

In operation, the vibratory bowls will operate continuously until the sensor 36 senses a coil 30 located at the filament coil discharge location 14. When the presence of a coil is sensed the vibratory bowl will be shut off and no further movement of the coils will occur so long as a coil is present at the filament coil discharge location. When a filament coil is needed by the mount machine, on a signal therefrom, a puff of air will be delivered through the nozzle 40 driving the filament coil located at the filament coil discharge location 14 to be driven into a conduit adapted to receive and convey an ejected filament coil to the mount machine. An ejected filament coil will proceed down the conduit 44 for delivery to a funnel 46, through the funnel 46 into a vibrating tube 48 which conveys the filament coil to the conventional walking beam 50. The conduit 48 is continuously vibrated by a commercially available horizontal vibrator 52 which causes the coil to exit from the conduit 48 onto the walking beam 50 for conventional delivery to an automatic mount machine. Acceleration produced by the puff of air and the effect of gravity as the coil proceeds down the tube 44 and through the funnel 46 can cause the coil to be projected beyond the walking beam 50. The horizontal vibration serves the unique function of slowing down the coil so that it is delivered to the walking beam 50 at the proper speed.

When a coil 30 has been ejected from the filament coil discharge location 14 by means of a puff of air from the nozzle 40 the sensor 36 will sense the absence of a coil at the filament coil discharge location and the vibratory bowl will automatically begin to vibrate until a filament coil reaches the discharge location 14 and is sensed to be present by the sensor 36 at which time the vibratory storage bowl will again shut off.

It has been found that a single vibratory bowl feed system will have a coil 30 present at the discharge location 14 about 95% of the time that a filament coil is requested by the automatic mount machine. Even with a dual-bowl system where coil filaments are delivered from bowl A or bowl B alternately, there again will only be a coil at the selected discharge location about 95% of the time the coil is needed. The use of a two-bowl system that merely feeds alternately does have the advantage that coils need only be replenished in the bowl by an attendant half as often. By employing the detecting and switching system of this invention, it has been found that coils are delivered on demand from the mount machine 99.96% of the time.

Referring now to FIG. 7, the detecting and switching circuit of this invention will be described. When the automatic mount machine indicates that a filament coil is needed, cam switches 54 and 56 are closed. Cam switch 54 causes the latch relay 58 which is essentially a mechanical flip-flop to flip from the A to the B mode or vice versa. The cam switch 56, when closed, completes the circuit to the air solenoids and causes a puff of air to be delivered from the nozzle 40a or 40b depending upon the condition of the selecting circuit 60. The selecting circuit 60 includes a plurality of relays which operate in response to conditions of the detectors 36a and 36b and the latch relay 58 to operate one or the other of the air solenoids 66a or 66b. The relay contacts 62a and 64a are operated by the detector 36a. When a filament coil is present at the filament coil discharge location 14a the detector 36a will cause the relay contact 62a to be closed and the relay contact 64a to be open. When no filament coil is present at the filament coil discharge location 14a the relay contact 62a will be open and the relay contact 64a will be closed. The same situation is true with respect to the operation of relay contacts 62b and 64b by the detector 36b. When a filament coil is present at the filament coil discharge location 14b the relay contact 62b will be closed and the relay contact 64a will be open. The relay contacts LRA and LRB are operated by the latch relay 58. When the latch relay 58 is in the A mode relay contact LRA will be closed and relay contact LRB will be open. Similarly, when the latch relay is in the B mode relay contact LRB will be closed and the relay contact LRA will be open.

Assuming the situation where a filament coil is present in both the filament coil discharge locations 14a and 14b and the latch relay is in the A mode both of the relay contacts 64a and 64b and LRB will be open and no signal can be transmitted to the air solenoid 66b. However, since relay contact 62a is closed along with relay contact LRA a signal will be transmitted to the air solenoid 66a and a filament coil delivered from the filament coil discharge location 14a by means of a puff of air being driven through nozzle 40a. Should the latch relay be in the A mode, thereby selecting a coil from the filament coil discharge location 14a, and no filament coil is present at the filament coil discharge location 14a but a filament coil is present at the filament coil discharge location 14b the situation will be such that relay contacts 64a and 62b will be closed and therefore a signal will be delivered to air solenoid 66b to cause a filament coil to be delivered to the mount machine from the filament coil discharge location 14b. With this system, 99.96% of the time a filament coil will be delivered to the mount machine on demand from the mount machine as opposed to the 95% of the time that the mount machine will receive a filament coil on demand without the switching circuit 60.

As will be apparent from the foregoing the filament coil delivery system of this invention delivers filament coils to the mount machine of either fluorescent or incandescent lamp making equipment with much greater efficiency than the prior art systems with a concurrent significant decrease in lamp shrinkage.

What is claimed is:

1. A method of delivering filament coils to a mount machine comprising the steps of:
   providing at least two separate storage containers for a plurality of filament coils with each of said at least two separate storage containers having a filament coil discharge location;
   sensing the need for a coil on said mount machine;
   sensing the presence or absence of a filament coil at a first of said filament coil discharge locations;
   sensing the presence or absence of a filament coil at a second of said filament coil discharge locations;
   preselecting alternately one of said filament coil discharge locations and directing a short burst of air at said preselected filament coil discharge location when the presence of a filament coil is sensed at said preselected filament coil discharge location and the need for a coil is indicated by said mount machine to thereby deliver a filament coil to said mount machine.

2. The method of claim 1 wherein, when a filament coil is not present at said preselected filament coil discharge location and the presence of a filament coil is sensed at the other of said filament coil discharge locations a short burst of air will be directed at said other filament coil discharge location to thereby deliver a filament coil to said mount machine.

3. An apparatus for delivering filament coils to a mount machine, said apparatus comprising:
at least first and second vibratory bowl means for storing a plurality of filament coils, each of said vibratory bowl means including a filament coil discharge location;
sensing means at each at said filament coil discharge locations for sensing the presence or absence of a filament coil at said filament coil discharge location;
air means for directing a short puff of air at said filament coil discharge locations, said short puff of air being sufficient to eject a filament coil from said filament coil discharge location;
means adjacent said filament coil discharge location for receiving and conveying an ejected filament coil to said mount machine; and
electrical circuit means responsive to a signal from said mount machine to select a sensed coil at one of said filament coil discharge locations and actuate its associated air means to eject a sensed filament coil into said means for receiving and conveying an ejected filament coil to said mount machine.

4. The apparatus of claim 3 wherein said electrical circuit means further includes means for switching from said selected filament coil discharge location when the absence of a filament coil is sensed thereat to the other of said filament coil discharge locations and activating said air means to eject a coil from said other of said filament coil discharge locations into said means for receiving and conveying an ejected filament coil to said mount machine.

5. The apparatus according to claim 4 wherein said means for switching includes a plurality of relays.

6. The apparatus according to claim 3 wherein said means adjacent said filament coil discharge location for receiving and conveying an ejected filament coil includes a horizontal vibrator for controlling the speed of travel of said coil filament as it proceeds to said mount machine.

7. The apparatus according to claim 4 wherein said means for switching from said selected filament coil discharge location includes a plurality of relay contacts in said circuit for activating said air means, said relay contacts being open or closed in response to the presence or absence of a filament coil at said filament coil discharge locations.

* * * * *